(12) United States Patent
Ishikawa et al.

(10) Patent No.: US 12,190,100 B2
(45) Date of Patent: *Jan. 7, 2025

(54) OTA SOFTWARE UPDATE BASED ON ECU NON-VOLATILE MEMORY TYPE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,488

(22) Filed: May 3, 2022

(65) Prior Publication Data

US 2022/0391193 A1 Dec. 8, 2022

(30) Foreign Application Priority Data

Jun. 7, 2021 (JP) .................. 2021-095022

(51) Int. Cl.
*G06F 8/654* (2018.01)
*G06F 8/65* (2018.01)

(52) U.S. Cl.
CPC ............. *G06F 8/654* (2018.02); *G06F 8/65* (2013.01)

(58) Field of Classification Search
CPC .................................. G06F 8/60–66
See application file for complete search history.

(56) References Cited

U.S. PATENT DOCUMENTS

| 7,047,128 B2 | 5/2006 | Dudel et al. |
| 10,908,891 B2 | 2/2021 | Nakaguma et al. |
| 11,693,645 B2 * | 7/2023 | Sakurai .................. H04W 4/14 717/173 |

(Continued)

FOREIGN PATENT DOCUMENTS

| CN | 108701064 A | 10/2018 |
| CN | 112585577 A | 3/2021 |

(Continued)

OTHER PUBLICATIONS

Nov. 21, 2023 Office Action issued in U.S. Appl. No. 17/830,419.

(Continued)

*Primary Examiner* — Todd Aguilera
(74) *Attorney, Agent, or Firm* — Oliff PLC

(57) ABSTRACT

An OTA master configured to control a software update on a first electronic control unit mounted on a vehicle and a software update on a second electronic control unit mounted on the vehicle includes one or more processors. The one or more processors are configured to separately receive a first distribution package of update data for the first electronic (Continued)

control unit and a second distribution package of update data for the second electronic control unit from a center. The first electronic control unit includes a non-volatile memory of a first type including one storage area. The second electronic control unit includes a non-volatile memory of a second type including two storage areas. The one or more processors are configured to perform the control of the software update in parallel on a plurality of the electronic control units to be updated, based on the received update data.

4 Claims, 7 Drawing Sheets

(56) References Cited

U.S. PATENT DOCUMENTS

| | | | |
|---|---|---|---|
| 11,954,480 B2* | 4/2024 | Ishikawa | G06F 8/65 |
| 12,039,322 B2* | 7/2024 | Ishikawa | H04L 67/12 |
| 12,050,903 B2* | 7/2024 | Ishikawa | H04W 4/40 |
| 2002/0035429 A1 | 3/2002 | Banas | |
| 2005/0256614 A1 | 11/2005 | Habermas | |
| 2015/0095898 A1 | 4/2015 | Mitchell et al. | |
| 2016/0196132 A1 | 7/2016 | Searle et al. | |
| 2019/0050219 A1 | 2/2019 | Seki | |
| 2020/0050378 A1 | 2/2020 | Sakurai et al. | |
| 2021/0157566 A1* | 5/2021 | Sakurai | G06F 16/2365 |
| 2021/0157568 A1 | 5/2021 | Sakurai et al. | |
| 2022/0342651 A1* | 10/2022 | Ishikawa | B60W 50/06 |
| 2022/0391192 A1* | 12/2022 | Ishikawa | G06F 8/65 |
| 2022/0391193 A1* | 12/2022 | Ishikawa | G06F 8/65 |
| 2022/0391194 A1* | 12/2022 | Ishikawa | H04L 67/34 |
| 2022/0405080 A1* | 12/2022 | Ishikawa | G06F 8/65 |
| 2022/0405083 A1* | 12/2022 | Ishikawa | G06F 8/65 |
| 2023/0004381 A1 | 1/2023 | Ma | |
| 2023/0236822 A1* | 7/2023 | Liu | B60R 16/0231 |

FOREIGN PATENT DOCUMENTS

| | | | |
|---|---|---|---|
| JP | 2004-326689 A | 11/2004 | |
| JP | 2015-205555 A | 11/2015 | |
| JP | 2020-027624 A | 2/2020 | |
| WO | WO-2020032195 A1 * | 2/2020 | B60R 16/023 |

OTHER PUBLICATIONS

Shi et al. "A Vehicle Electric Control Unit Over-The-Air Reprogramming System", International Conference on Connected Vehicles and Expo (ICCVE), 2015, pp. 48-51.

Mbakoyiannis et al. "Secure Over-the-air Firmware Updating for Automotive Electronic Control Units", Proceedings of the 34th ACM/SIGAPP symposium on applied computing, 2019, pp. 174-181.

Kim et al., "ECU Software Updating Scenario Using OTA Technology through Mobile Communication Network", IEEE 3rd International Conference on Communication and Information Systems (ICCIS), 2018, pp. 67-72.

Dec. 7, 2023 Office Action issued in U.S. Appl. No. 17/729,297.
Jun. 5, 2024 Office Action issued in U.S. Appl. No. 17/729,297.
Apr. 10, 2024 Notice of Allowance issued in U.S. Appl. No. 17/830,419.
Sep. 16, 2024 Office Action issued in U.S. Appl. No. 17/729,297.

* cited by examiner

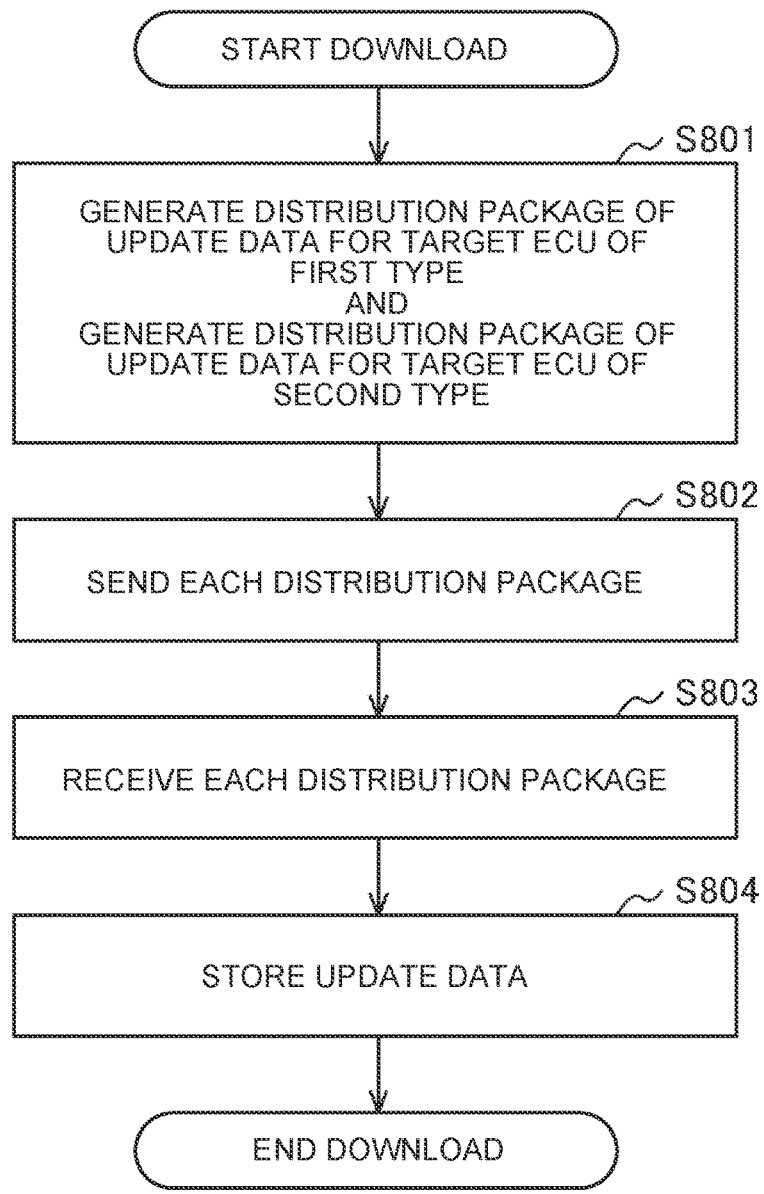

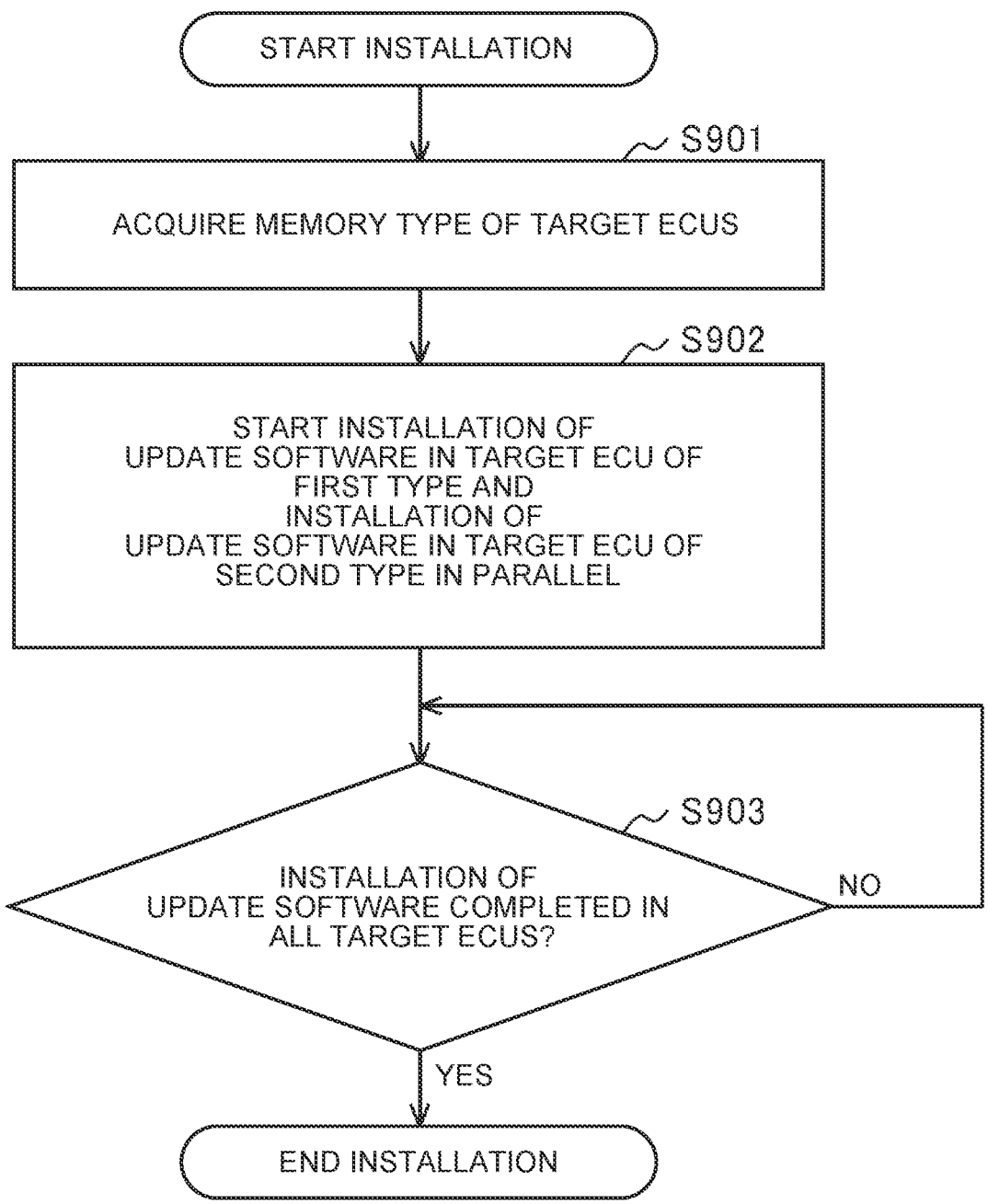

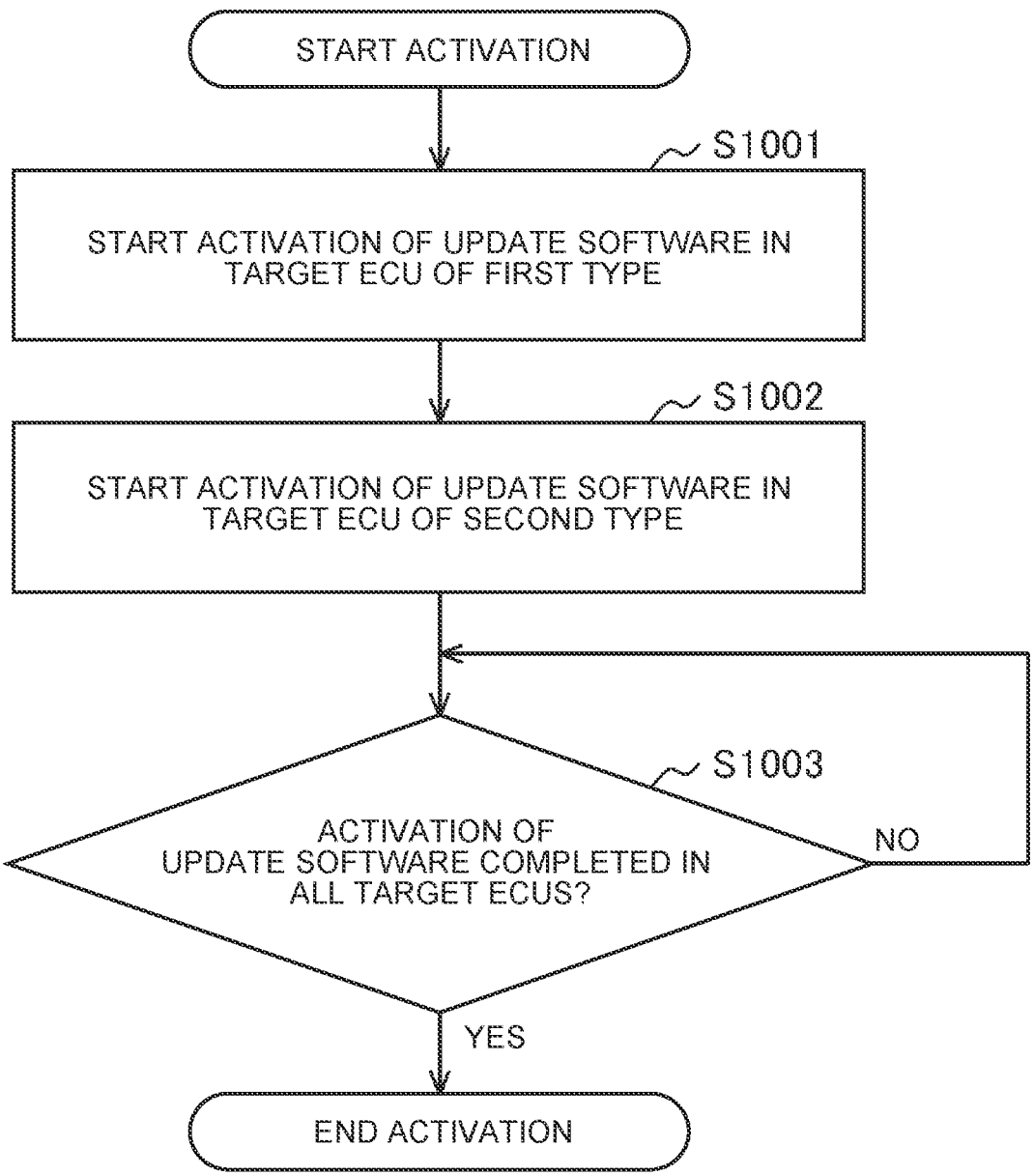

OTA SOFTWARE UPDATE BASED ON ECU NON-VOLATILE MEMORY TYPE

CROSS-REFERENCE TO RELATED APPLICATION

This application claims priority to Japanese Patent Application No. 2021-095022 filed on Jun. 7, 2021, incorporated herein by reference in its entirety.

BACKGROUND

1. Technical Field

The present disclosure relates to OTA masters, systems, methods, non-transitory storage media, and vehicles that control software updates on electronic control units.

2. Description of Related Art

A vehicle is equipped with a plurality of electronic control units (ECUs) that controls the operation of the vehicle. The electronic control unit includes a processor, a temporary storage unit such as random access memory (RAM), and a non-volatile memory that is a non-volatile storage unit such as flash read-only memory (ROM). The electronic control unit implements its control functions by the processor executing software stored in the non-volatile memory. The software stored in each electronic control unit is rewritable. Updating the software on the electronic control unit to a newer version of the software can improve the functions of the electronic control unit and add new vehicle control functions to the electronic control unit.

Over-the-air (OTA) technology is known as a technology for updating software on electronic control units. A device that performs a software update process for the vehicle is wirelessly connected to both in-vehicle communication equipment connected to an in-vehicle network and a communication network such as the Internet. The device downloads software from a server via wireless communication and installs the downloaded software in the electronic control unit to update software on the electronic control unit or add software to the electronic control unit. See, for example, Japanese Unexamined Patent Application Publication No. 2004-326689 (JP 2004-326689 A).

There are two types of non-volatile memories that are installed in the electronic control units: memories with one storage area for storing data such as software (single bank memories), and memories with two storage areas for storing data such as software (dual bank memories). These types of non-volatile memories are used properly in accordance with the specifications of the electronic control units etc. The electronic control unit with a dual bank memory can store two versions of data, namely old and new versions of data, in the two storage areas.

SUMMARY

There are cases where both the electronic control unit with a single bank memory and the electronic control unit with a dual bank memory are electronic control unit with a software to be updated in a campaign that is a software update event for a vehicle. A recovery method (method for restoring to the software before update) that is performed when a software update fails varies between the electronic control unit with a single bank memory and the electronic control unit with a dual bank memory due to the memory structure. That is, when a software update on the electronic control unit with a single bank memory fails, software before update is rewritten to the single bank memory. On the other hand, in the electronic control unit with a dual bank memory, software after update and software before update are written to different storage areas of the dual bank memory. Accordingly, when a software update fails, the electronic control unit with a dual bank memory is controlled to read software from the storage area in which the software before update is written. That is, it is not necessary to rewrite the software before update in the electronic control unit with a dual bank memory.

There are cases where a campaign in which both an electronic control unit with a single bank memory and an electronic control unit with a dual bank memory are electronic control unit to be updated is applied to the vehicle. In this case, it is desired to download and install appropriate software in accordance with the memory structure of the individual electronic control units to be updated.

The present disclosure provides an OTA master, system, method, non-transitory storage medium, and vehicle that can execute software updates suitable for a single bank memory and a dual bank memory.

A first aspect of the technique of the present disclosure relates to an OTA master configured to control a software update on a first electronic control unit mounted on a vehicle and a software update on a second electronic control unit mounted on the vehicle. The OTA master includes one or more processors. The one or more processors are configured to separately receive a first distribution package of update data for the first electronic control unit and a second distribution package of update data for the second electronic control unit from a center. The first electronic control unit includes a non-volatile memory of a first type. The non-volatile memory of the first type includes one storage area. The second electronic control unit includes a non-volatile memory of a second type. The non-volatile memory of the second type includes two storage areas. The one or more processors are configured to perform control of the software update in parallel on a plurality of electronic control units to be updated, based on the update data that is received.

In the OTA master according to the first aspect of the technique of the present disclosure, the one or more processors may be configured to acquire type information from the center. The type information may indicate whether the non-volatile memory of each of the electronic control units is the non-volatile memory of the first type or the non-volatile memory of the second type.

In the OTA master according to the first aspect of the technique of the present disclosure, the one or more processors may be configured to store type information. The type information may indicate whether the non-volatile memory of each of the electronic control unit is the non-volatile memory of the first type or the non-volatile memory of the second type.

In the OTA master according to the first aspect of the technique of the present disclosure, the one or more processors may be configured to perform the control of the software update on the electronic control units to be updated, based on the type information and the update data that is received.

In the OTA master according to the first aspect of the technique of the present disclosure, the one or more processors may be configured to perform the control of the software update in parallel on the first electronic control unit and the second electronic control unit, based on the update data.

In the OTA master according to the first aspect of the technique of the present disclosure, the one or more processors may be configured to transfer the update data that is received, in parallel to the electronic control units to be updated.

A second aspect of the technique of the present disclosure relates to a system including: an OTA master configured to control a software update on a first electronic control unit mounted on a vehicle and a software update on a second electronic control unit mounted on the vehicle; and a center configured to communicate with the OTA master. The center is configured to separately send a first distribution package of update data for the first electronic control unit and a second distribution package of update data for the second electronic control unit to the OTA master. The first electronic control unit includes a non-volatile memory of a first type. The non-volatile memory of the first type includes one storage area. The second electronic control unit includes a non-volatile memory of a second type. The non-volatile memory of the second type includes two storage areas. The OTA master is configured to separately receive the first distribution package and the second distribution package sent from the center. The OTA master is configured to perform control of the software update in parallel on a plurality of electronic control units to be updated, based on the update data that is received.

In the system according to the second aspect of the technique of the present disclosure, at least one of the center and the OTA master may be configured to store type information indicating whether the non-volatile memory of each of the electronic control units is the non-volatile memory of the first type or the non-volatile memory of the second type.

A third aspect of the technique of the present disclosure relates to a method that is performed by an OTA master configured to control a software update on a first electronic control unit mounted on a vehicle and a software update on a second electronic control unit mounted on the vehicle. The OTA master includes one or more processors and a memory. The method includes separately receiving a first distribution package of update data for the first electronic control unit and a second distribution package of update data for the second electronic control unit from a center. The first electronic control unit includes a non-volatile memory of a first type. The non-volatile memory of the first type includes one storage area. The second electronic control unit includes a non-volatile memory of a second type. The non-volatile memory of the second type includes two storage areas. The method further includes performing control of the software update in parallel on a plurality of electronic control units to be updated, based on the update data that is received.

A fourth aspect of the technique of the present disclosure relates to a non-transitory storage medium storing instructions that are executable by one or more computers of an OTA master and that cause the one or more computers of the OTA master to perform functions. The OTA master is configured to control a software update on a first electronic control unit mounted on a vehicle and a software update on a second electronic control unit mounted on the vehicle. The OTA master includes one or more processors and a memory. The functions include separately receiving a first distribution package of update data for the first electronic control unit and a second distribution package of update data for the second electronic control unit from a center. The first electronic control unit includes a non-volatile memory of a first type. The non-volatile memory of the first type includes one storage area. The second electronic control unit includes a non-volatile memory of a second type. The non-volatile memory of the second type includes two storage areas. The functions further include performing control of the software update in parallel on a plurality of electronic control units to be updated, based on the update data that is received.

The OTA master according to the first aspect of the technique of the present disclosure may be mounted on a vehicle.

The present disclosure can thus provide an OTA master, system, method, non-transitory storage medium, and vehicle that can execute software updates (download, install) suitable for a single bank memory and a dual bank memory.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 shows an example of type information;

FIG. 8 shows an example of a flowchart of a download procedure that is performed by the center and the OTA master;

FIG. 9 shows an example of a flowchart of an installation procedure that is performed by the OTA master and target electronic control units; and FIG. 10 shows an example of a flowchart of an activation procedure that is performed by the OTA master and the target electronic control units.

DETAILED DESCRIPTION OF EMBODIMENTS

In a network system of the present disclosure, an OTA master receives update data for an electronic control unit with a single bank memory and update data for an electronic control unit with a dual bank memory in the form of separate distribution packages from a center. The OTA master executes installation of the update data for the electronic control unit with a single bank memory and installation of the update data for the electronic control unit with a dual bank memory in parallel. Software updates suitable for a single bank memory and a dual bank memory can thus be executed.

An embodiment of the present disclosure will be described in detail with reference to the drawings.

Embodiment

Configuration

Figure 1:
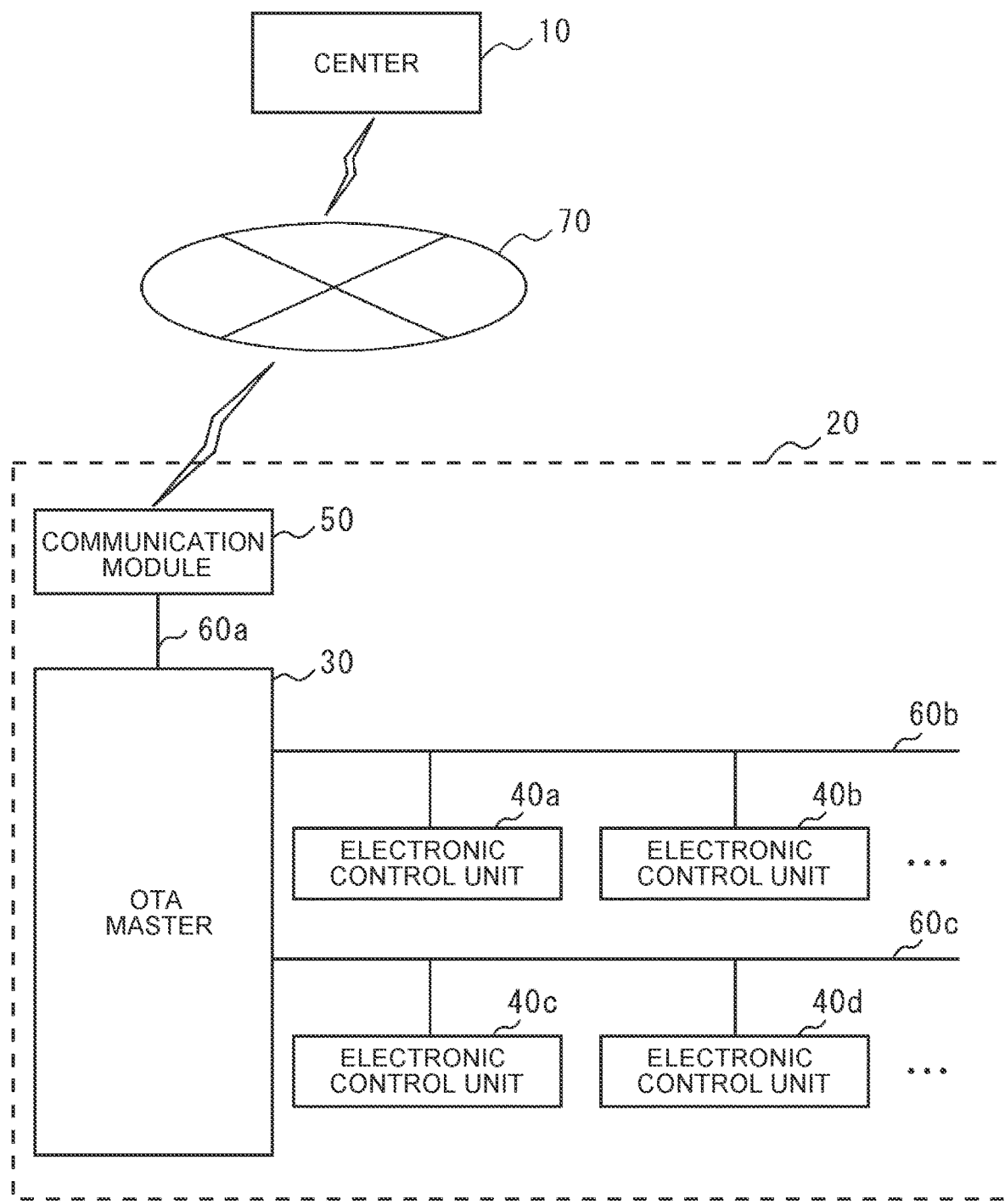
FIG. 1 is a block diagram showing an overall configuration of a network system according to an embodiment.

FIG. 1 is a block diagram showing an overall configuration of a network system according to an embodiment of the present disclosure. The network system shown in FIG. 1 is a system for updating software on a plurality of electronic control units 40a to 40d installed in a vehicle. The network system includes a center 10 outside the vehicle, an in-vehicle network 20 constructed inside the vehicle, and a network 70.

(1) Center

The center 10 can communicate with an OTA master 30 of the in-vehicle network 20 via the network 70. The OTA master 30 will be described later. The center 10 sends software update data for the electronic control units 40a to 40d to the OTA master 30, and receives a notification indicating the progress of a software update process from the OTA master 30. The center 10 can thus control and manage software updates on the electronic control units 40a to 40d connected to the OTA master 30. The center 10 has functions of a so-called server.

Figure 2:
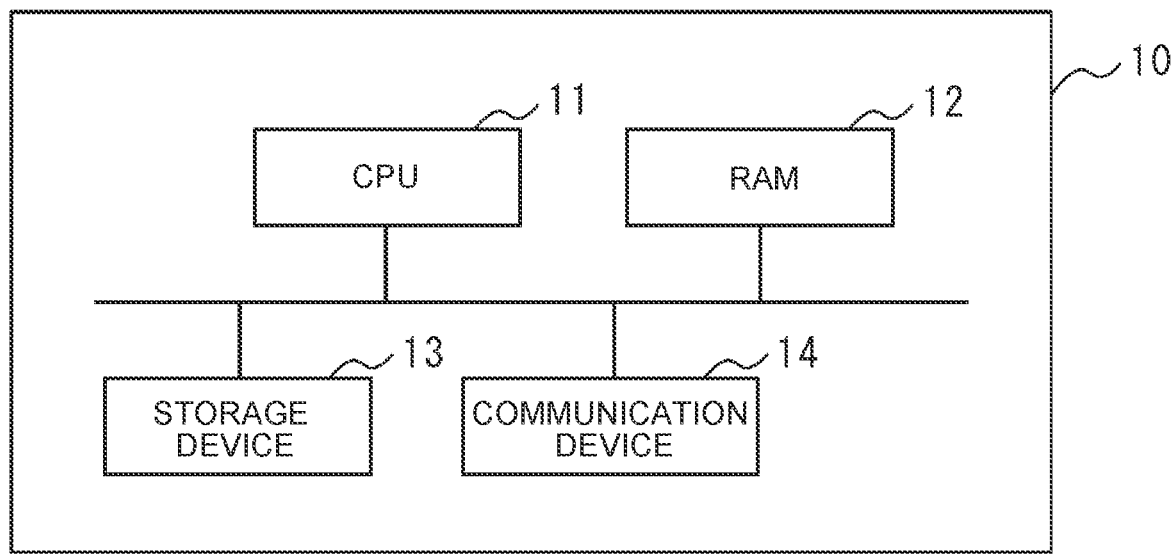
FIG. 2 is a block diagram showing a schematic configuration of a center.

FIG. 2 is a block diagram showing a schematic configuration of the center 10 in FIG. 1. As shown in FIG. 2, the center 10 includes a central processing unit (CPU) 11, a random access memory (RAM) 12, a storage device 13, and a communication device 14. The storage device 13 is a device including a readable and writable storage medium such as a hard disk drive (HDD) or a solid state drive (SSD). For example, the storage device 13 stores programs for performing software update management, information to be used for software update control and software update management, and software update data for each electronic control unit. In the center 10, the CPU 11 executes the programs read from the storage device 13 by using the RAM 12 as a work area to perform a predetermined process related to a software update. The communication device 14 is a device for communicating with the OTA master 30 via the network 70 shown in FIG. 1.

Figure 3:
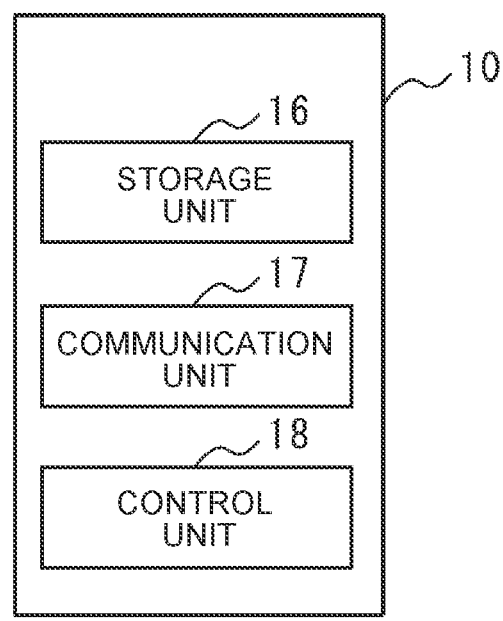
FIG. 3 is a functional block diagram of the center.

FIG. 3 is a functional block diagram of the center 10 shown in FIG. 2. The center 10 illustrated in FIG. 3 includes a storage unit 16, a communication unit 17, and a control unit 18. The storage unit 16 is implemented by the storage device 13 shown in FIG. 2. The communication unit 17 and the control unit 18 are implemented by the CPU 11 in FIG. 2 executing the programs stored in the storage device 13 by using the RAM 12.

The storage unit 16 stores information on the software update process for one or more electronic control units installed in the vehicle. As the information on the software update process, the storage unit 16 stores at least update management information and software update data for the electronic control units 40a to 40d. The update management information is information in which information indicating software available for the electronic control units 40a to 40d is associated with vehicle identification information (vehicle ID) identifying the vehicle. An example of the information indicating software available for the electronic control units 40a to 40d is a combination of pieces of latest version information of software products for the electronic control units 40a to 40d. As the information on the software update process, the storage unit 16 can also store an update status of a software update being performed in the vehicle. The storage unit 16 can further store information (described later) on the type of non-volatile memory installed in each of the electronic control units 40a to 40d.

The communication unit 17 functions as a transmission unit and reception unit that send and receive data, information, requests, etc. to and from the OTA master 30. The communication unit 17 receives a software update check request from the OTA master 30 (reception unit). For example, the update check request is information to be sent from the OTA master 30 to the center 10 when the power or ignition of the vehicle is turned on (hereinafter referred to as "powered ON"). The update check request is information requesting the center 10 to check whether there is update data for the electronic control units 40a to 40d based on vehicle configuration information described later. In response to the update check request received from the OTA master 30, the communication unit 17 sends information indicating whether there is update data to the OTA master 30 (transmission unit). The communication unit 17 also receives a distribution package transmission request (download request) from the OTA master 30 (reception unit). In response to the distribution package download request, the communication unit 17 sends, to the OTA master 30, a distribution package of the software update data for the electronic control units 40a to 40d generated by the control unit 18 described later (transmission unit).

When the communication unit 17 receives the update check request from the OTA master 30, the control unit 18 determines whether there is software update data for the electronic control units 40a to 40d installed in the vehicle identified by the vehicle ID included in the update check request, based on the update management information stored in the storage unit 16. The control unit 18 sends the result of the determination as to whether there is software update data to the OTA master 30 via the communication unit 17. When the control unit 18 determines that there is software update data for the electronic control units 40a to 40d, the control unit 18 generates a distribution package of the update data for the electronic control unit determined that there is software update, that is stored in the storage unit 16 in response to the distribution package download request received from the OTA master 30.

The control unit 18 separately generates a distribution package of only the update data for the electronic control unit with a single bank memory, and a distribution package of only the update data for the electronic control unit with a dual bank memory. The single bank memory and the dual bank memory will be described later. The distribution package of only the update data for the electronic control unit with a single bank memory is an example of the "first distribution package." The distribution package of only the update data for the electronic control unit with a dual bank memory is an example of the "second distribution package." When type information, namely information on the type of non-volatile memory, is stored in advance in the storage unit 16, the control unit 18 can intentionally generate separate distribution packages of update data for the different types of non-volatile memories. The type information will be described later. As the control unit 18 thus generates separate distribution packages of update data for the different types of non-volatile memories, (the communication unit 17 of) the center 10 can separately send the distribution package of update data for the electronic control unit with a non-volatile memory of a first type and the distribution package of update data for the electronic control unit with a non-volatile memory of a second type to the OTA master 30.

(2) In-Vehicle Network

The in-vehicle network 20 includes the OTA master 30, the electronic control units 40a to 40d, and a communication module 50. The OTA master 30 and the communication module 50 are connected via a bus 60a. The OTA master 30 and the electronic control units 40a and 40b are connected via a bus 60b. The OTA master 30 and the electronic control units 40c and 40d are connected via a bus 60c.

The OTA master 30 can communicate wirelessly with the center 10 via the network 70 through the bus 60a and the communication module 50. The OTA master 30 manages the OTA state. The OTA master 30 has a function to control an update sequence that is a flow of the software update process and perform a software update on the electronic control unit to be updated (hereinafter referred to as "target electronic control unit"). The OTA master 30 controls the software update on the target electronic control unit based on, for example, the update data acquired from the center 10. The target electronic control unit is an electronic control unit whose software is to be updated out of the electronic control units 40a to 40d. One or more target electronic control units may function as the OTA master 30. The OTA master 30 is sometimes referred to as "central gateway (CGW)."

Figure 4:
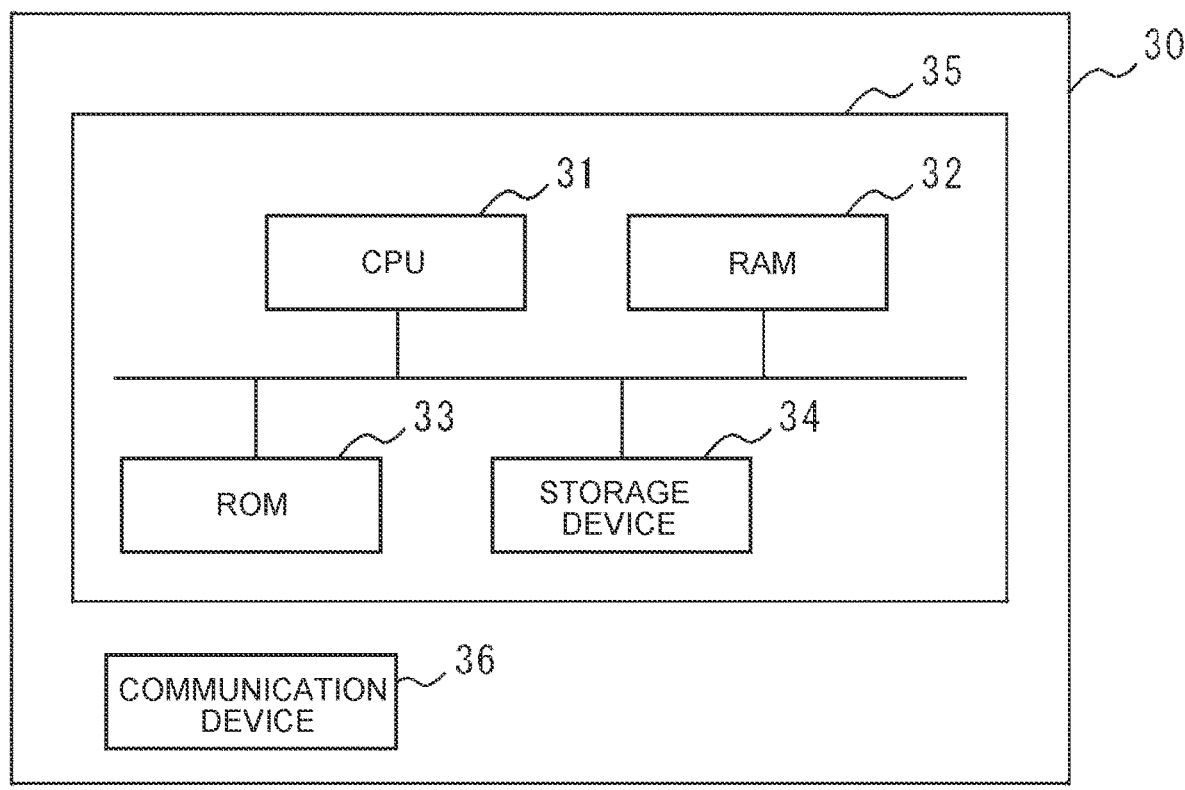
FIG. 4 is a block diagram showing a schematic configuration of an OTA master.

FIG. 4 is a block diagram showing a schematic configuration of the OTA master 30 in FIG. 1. As illustrated in FIG. 4, the OTA master 30 includes a CPU 31, a RAM 32, a read-only memory (ROM) 33, a storage device 34, and a communication device 36. The CPU 31, the RAM 32, the ROM 33, and the storage device 34 constitute a microcomputer 35. In the OTA master 30, the CPU 31 executes programs read from the ROM 33 by using the RAM 32 as a work area to perform a predetermined process related to a software update. The communication device 36 communicates with the communication module 50 and the electronic control units 40a to 40d via the buses 60a to 60c shown in FIG. 1.

Figure 5:
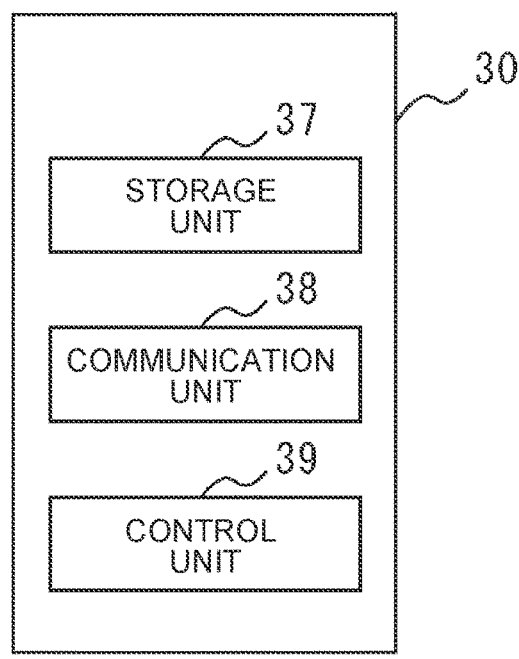
FIG. 5 is a functional block diagram of the OTA master.

FIG. 5 is a functional block diagram of the OTA master 30 shown in FIG. 4. The OTA master 30 illustrated in FIG. 5 includes a storage unit 37, a communication unit 38, and a control unit 39. The storage unit 37 is implemented by the storage device 34 shown in FIG. 4. The communication unit 38 and the control unit 39 are implemented by the CPU 31 in FIG. 4 executing programs stored in the ROM 33 by using the RAM 32.

The storage unit 37 stores, for example, programs for executing software updates on the electronic control units 40a to 40d (control programs for the OTA master 30), various kinds of data to be used when executing the software updates, and software update data downloaded from the center 10. The storage unit 37 can further store type information (described later), namely information on the type of non-volatile memory installed in each of the electronic control units 40a to 40d.

The communication unit 38 functions as a transmission unit and reception unit that send and receive data, information, requests, etc. to and from the center 10. For example, the communication unit 38 sends a software update check request to the center 10 when the vehicle is powered ON (transmission unit). For example, the update check request includes the vehicle ID identifying the vehicle, and information on the current versions of software on the electronic control units 40a to 40d connected to the in-vehicle network 20. The vehicle ID and the current versions of software on the electronic control units 40a to 40d are used to determine whether there is software update data for the electronic control units 40a to 40d by making comparison with the latest versions of software held in the center 10 for each vehicle ID. The communication unit 38 receives a notification indicating whether there is update data from the center 10 as a response to the update check request (reception unit). When there is software update data for the electronic control units 40a to 40d, the communication unit 38 sends a download request for a distribution package of the software update data to the center 10 (transmission unit). The communication unit 38 then receives (downloads) the distribution package sent from the center 10 (reception unit). The communication unit 38 sends software update statuses received from the electronic control units 40a to 40d to the center 10 (transmission unit).

The control unit 39 determines whether there is software update data for the electronic control units 40a to 40d based on the response to the update check request that the communication unit 38 received from the center 10. The control unit 39 also verifies the authenticity of the distribution package that the communication unit 38 received (downloaded) from the center 10 and stored in the storage unit 37. The control unit 39 also controls the software update process (various kinds of verification, installation, activation, etc.) for the electronic control units 40a to 40d by using the update data received (downloaded) from the center 10. Specifically, the control unit 39 transfers one or more pieces of update data downloaded in the form of the distribution package to the target electronic control unit. The control unit 39 causes the target electronic control unit to install the update software based on the update data. After the installation is completed, the control unit 39 instructs the target electronic control unit to activate (enable) the installed update software. In this software update process, the control unit 39 suitably controls procedures such as various kinds of verification, installation, and activation in the electronic control units 40a to 40d.

The electronic control units 40a to 40d are devices (ECUs) for controlling the operation of various parts of the vehicle. Although FIG. 1 shows an example in which the in-vehicle network 20 includes four electronic control units 40a to 40d, the number of electronic control units is not particularly limited. For example, a display device (human-machine interface (HMI)) may be connected to the OTA master 30. The display device may display various indications during the software update process for the electronic control units 40a to 40d, such as an indication that there is update data, an accept request screen requesting a user or administrator of the vehicle to accept a software update, and a software update result. An automotive navigation system etc. can be used as the display device. The number of buses connecting the electronic control units to the OTA master 30 is also not particularly limited. For example, the display device may be connected to the OTA master 30 via a bus other than the buses 60a to 60c.

Figure 6A:
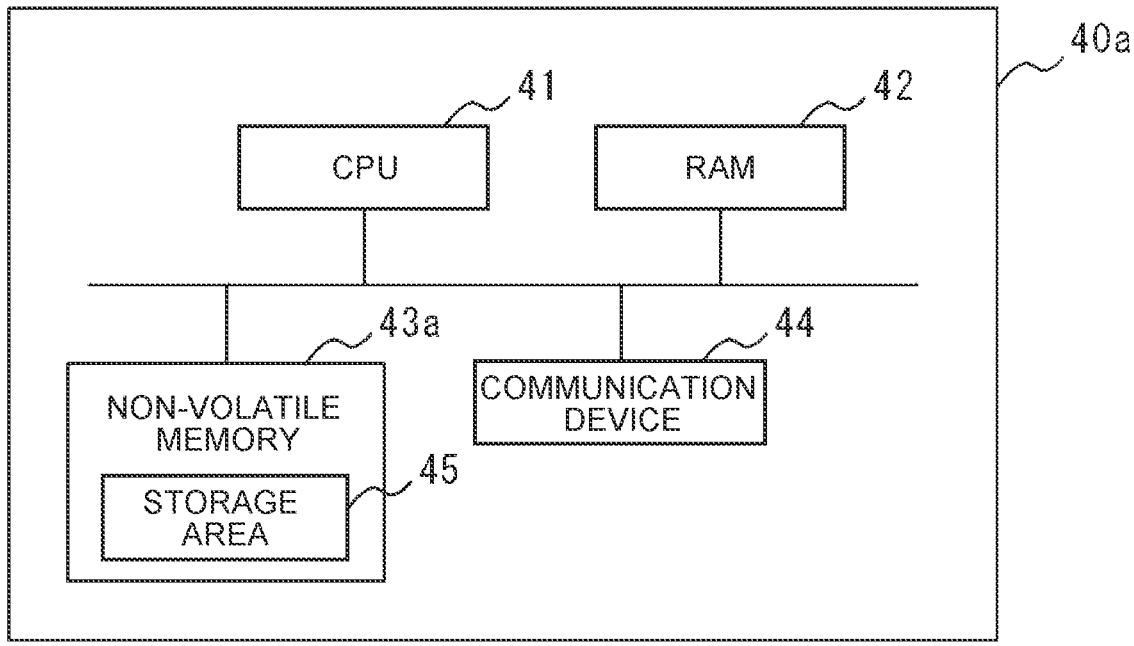
FIG. 6A is a block diagram showing an example of a schematic configuration of an electronic control unit.
Figure 6B:
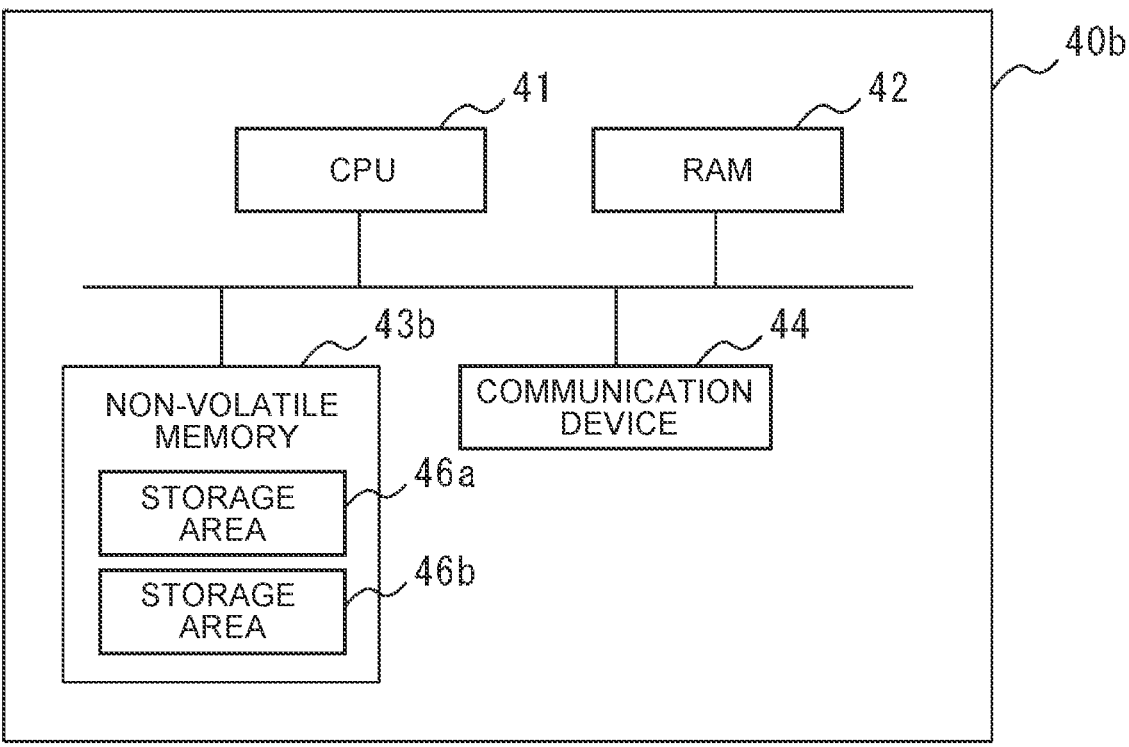
FIG. 6B is a block diagram showing an example of a schematic configuration of an electronic control unit.

An example of the schematic configuration of the electronic control units 40a to 40d is shown in FIGS. 6A and 6B.

The electronic control unit 40a shown in FIG. 6A includes a CPU 41, a RAM 42, a non-volatile memory 43a, and a communication device 44. The electronic control unit 40a is an example of the "first electronic control unit." The CPU 41 implements functions of the electronic control unit 40a by executing programs read from the non-volatile memory 43a by using the RAM 42 as a work area. The non-volatile memory 43a is a memory with one storage area 45 for storing data such as software (hereinafter referred to as "single bank memory"). Hereinafter, the type of the non-volatile memory 43a with one storage area 45 is referred to as "first type." In addition to the software for implementing the functions of the electronic control unit 40a, version information, parameter data, a boot program for booting, a program for software update, etc. may be stored in the storage area 45. The communication device 44 is a device for communicating with the OTA master 30 and the other electronic control units 40b to 40d connected to the in-vehicle network 20.

Like the electronic control unit 40a, the electronic control unit 40b shown in FIG. 6B includes a CPU 41, a RAM 42, a non-volatile memory 43b, and a communication device 44. The electronic control unit 40b is an example of the "second electronic control unit." The non-volatile memory 43b installed in the electronic control unit 40b is a memory with two storage areas 46a and 46b for storing data such as software (hereinafter referred to as "dual bank memory").

Hereinafter, the type of the non-volatile memory 43b with two storage areas 46a and 46b is referred to as "second type." In addition to the software for implementing the functions of the electronic control unit 40b, version information, parameter data, a boot program for booting, a program for software update, etc. may be stored in the storage areas 46a and 46b. The CPU 41 of the electronic control unit 40b uses one of the two storage areas 46a and 46b of the non-volatile memory 43b as a storage area to be read (active bank), and executes software stored in the storage area to be read. During execution of a program stored in the storage area to be read (active bank), update software (updated version of program) based on update data can be installed (written) in the background in the other storage area not to be read (inactive bank). For activation in the software update process (activation of the update software), the CPU 41 of the electronic control unit 40b can activate the update software by switching the storage area from which the program is to be read.

As a specific example, it is assumed that the current version of software is stored in the storage area 46a of the non-volatile memory 43b that is a dual bank memory and update software has been installed in the storage area 46b. For example, when the OTA master 30 instructs the electronic control unit 40b to activate the update software, the electronic control unit 40b switches the read start address of the CPU 41 from the top address of the storage area 46a to the top address of the storage area 46b. The electronic control unit 40b can thus switch the storage area to be read by the CPU 41 (active bank) and execute the update software installed in the storage area 46b. In the present disclosure, a configuration called a "single-sided suspend memory" in which one storage area is pseudo-divided into two sides so that a program can be written to the other side while a program stored in one side is being executed also belongs to the second type of memory.

FIG. 7 shows an example of the type information that is information on the type of non-volatile memory installed in each of the electronic control units 40a to 40d. In the type information illustrated in FIG. 7, ECU ID that is a number identifying the electronic control unit is associated with the type of non-volatile memory (first type (single bank) or second type (dual bank)) installed in the electronic control unit. The type information is stored and managed in either or both of the storage unit 37 of the OTA master 30 and the storage unit 16 of the center 10. The type information is created in advance based on the specifications of the electronic control units 40a to 40d that constitute the in-vehicle network 20. The type information may be stored in the storage unit 37 of the OTA master 30 at the time of manufacturing the vehicle etc. The OTA master 30 may acquire the type information from the target electronic control unit via communication in the in-vehicle network 20 during the software update process. When the center 10 manages the type information, the OTA master 30 may acquire the type information from the center 10 via the network 70.

The communication module 50 is a unit having a function to control communication between the center 10 and the vehicle, and is communication equipment for connecting the in-vehicle network 20 to the center 10. The communication module 50 is wirelessly connected to the center 10 via the network 70. The OTA master 30 authenticates the vehicle, download update data, etc. via the communication module 50. The communication module 50 may be included in the OTA master 30.

Overview of Software Update Process

For example, the OTA master 30 sends a software update check request to the center 10 when the vehicle is powered ON. The update check request includes the vehicle ID identifying the vehicle, and the vehicle configuration information. The vehicle configuration information is information on the state of the electronic control units (system configuration), such as hardware and current versions of software of the electronic control units 40a to 40d connected to the in-vehicle network 20. The vehicle configuration information can be created by acquiring identification numbers of the electronic control units (ECU IDs) and identification numbers of the versions of software on the electronic control units (ECU Software IDs) from the electronic control units 40a to 40d connected to the in-vehicle network 20. The vehicle ID and the current versions of software on the electronic control units 40a to 40d are used to determine whether there is software update data for the electronic control units 40a to 40d by making comparison with the latest versions of software held in the center 10 for each vehicle ID. In response to the update check request received from the OTA master 30, the center 10 sends a notification indicating whether there is update data to the OTA master 30. When there is software update data for the electronic control units 40a to 40d, the OTA master 30 sends a distribution package download request to the center 10. In response to the download request received from the OTA master 30, the center 10 sends a distribution package of the update data to the OTA master 30. The distribution package may include, in addition to the update data, verification data for verifying the authenticity of the update data, the number of pieces of the update data, the type information, various kinds of control information to be used during software update, etc.

The OTA master 30 determines whether there is software update data for the electronic control units 40a to 40d based on the response to the update check request received from the center 10. The OTA master 30 verifies the authenticity of the distribution package received from the center 10 and stored in the storage device 13. The OTA master 30 transfers one or more pieces of update data downloaded in the form of the distribution package to the target electronic control unit, and causes the target electronic control unit to install the update data. After the installation is completed, the OTA master 30 instructs the target electronic control unit to activate the installed updated version of software.

In an accept request process, the OTA master 30 causes an output device to output a notification that the software update needs to be accepted, and a notification prompting for input accepting the software update. Examples of the output device include a display device (not shown) that is provided in the in-vehicle network 20 and that provides notifications by display, and an audio output device (not shown) that provides notifications by sound or voice. For example, when the display device is used as the output device in the accept request process, the OTA master 30 can cause the display device to display an accept request screen requesting the user or administrator to accept the software update, and to display a notification prompting the user or administrator to perform a specific input operation such as pressing of an accept button when the use or administrator accepts the software update. In the accept request process, the OTA master 30 can cause the display device to display texts, icons, etc. notifying that there is software update data for the electronic control units 40a to 40d, and to display restrictions to be imposed during the software update process. In response to the input accepting the software update from the user or administrator, the OTA master 30 performs a control process for the installation and activation to update the software on the target electronic control unit.

When the non-volatile memory of the target electronic control unit is a single bank memory, the installation and activation are executed generally in succession. Therefore, the accept request process for the software update is performed before the installation. Even when the non-volatile memory of the target electronic control unit is a single bank memory, the target electronic control unit may be requested to temporarily stop the update process, that is, to wait for (hold) activation, after completion of the installation. When the non-volatile memory of the target electronic control unit is a dual bank memory, the accept request process for the software update is performed at least after the installation and before the activation. When the non-volatile memory of the electronic control unit is a dual bank memory, the accept request process for the software update before the installation may be performed or omitted.

The software update process includes a download phase, an installation phase, and an activation phase. In the download phase, the OTA master 30 downloads (receives) update data from the center 10. In the installation phase, the OTA master 30 transfers the downloaded update data to the target electronic control unit and installs (writes) update software based on the update data in the storage area of the target electronic control unit. In the activation phase, the target electronic control unit activates (enables) the installed update software.

Download is a process in which the OTA master 30 receives the update data for updating the software of the electronic control unit sent in the form of a distribution package from the center 10 and stores the update data in the storage unit 37. For the download, the OTA master 30 separately receives update data for the electronic control unit with a dual bank memory and update data for the electronic control unit with a single bank memory. The download phase includes not only execution of the download but also control of a series of processes related to the download, such as determination as to whether the download can be executed and verification of the update data.

The update data sent from the center 10 to the OTA master 30 may include any of the following: update software for the electronic control unit (all data or difference data), compressed data that the update software is compressed, and divided data that the update software or the compressed data are divided. The update data may include the ECU ID (or serial number) of the target electronic control unit and the ECU Software ID of the electronic control unit before update. The update data is downloaded in the form of the distribution package. The distribution package includes update data for a single electronic control unit or a plurality of pieces of update data for a plurality of electronic control units of the same memory type.

Installation is a process in which the OTA master 30 writes update software (updated version of program) to the non-volatile memories 43a and/or 43b of a plurality of target electronic control units in a predetermined order based on the update data downloaded from the center 10. Installation of the update data for the electronic control unit with a single bank memory and installation of the update data for the electronic control unit with a dual bank memory are executed in parallel. The installation phase includes not only execution of the installation but also control of a series of processes related to the installation, such as determination as to whether the installation can be executed, transfer of the update data, and verification of the update software.

When the update data includes update software (all data), the OTA master 30 transfers the update data (update software) to the target electronic control unit in the installation phase. When the update data includes compressed data, difference data, or divided data of the update software, the OTA master 30 may transfer the update data to the target electronic control unit, and the target electronic control unit may generate the update software from the update data. The OTA master 30 may generate the update software from the update data and then transmit the update software to the target electronic control unit.

The update software can be generated by decompressing the compressed data or assembling (integrating) the difference data or the divided data.

Installation of the update software can be executed by the target electronic control unit based on an installation request from the OTA master 30. A specific target electronic control unit that has received the update data may autonomously execute the installation without receiving an explicit instruction from the OTA master 30.

Activation is a process in which the target electronic control unit activates the update software installed in the non-volatile memory 43a and/or 43b. Either activation of the update data for the electronic control unit with a single bank memory or activation of the update data for the electronic control unit with a dual bank memory may be executed preferentially over the other, or activation of the update data for the electronic control unit with a single bank memory and activation of the update data for the electronic control unit with a dual bank memory may be executed without priority of one activation over the other. The activation phase includes not only execution of the activation but also a series of controls related to the activation, such as determination as to whether the activation can be executed, a request for the user or administrator of the vehicle to accept the activation, and verification of execution results.

Activation of the update software can be executed by the target electronic control unit based on an activation request from the OTA master 30. A specific target electronic control unit that has received the update data may autonomously execute the activation after completion of the installation without receiving an explicit instruction from the OTA master 30.

The software update process can be performed successively or in parallel on a plurality of target electronic control units.

The "software update process" as used herein includes not only a process of successively executing all of the download, installation, and activation, but also a process of executing only a part of the download, installation, and activation. Processes Next, some specific examples of the software update process that is performed in the network system according to the present embodiment will be described with further reference to FIGS. 8, 9, and 10.

(1) Specific Example of Download

FIG. 8 is a flowchart illustrating a processing procedure according to a specific example of the download that is executed by the center 10 and the OTA master 30. The download process illustrated in FIG. 8 is started when the center 10 receives a distribution package download request from the OTA master 30.

Step S801

Out of the target electronic control unit whose software is to be updated (hereinafter referred to as "target ECU"), the center 10 generates a distribution package of update data for the target electronic control unit with the non-volatile memory of the first type (hereinafter referred to as "the target ECU of the first type"). The center 10 also generates a distribution package of update data for the target ECU with the non-volatile memory of the second type (hereinafter referred to as "the target ECU of the second type") out of the target ECUs whose software is to be updated. At this time, the center 10 can determine the type of the non-volatile memory of the target ECU by referring to the type information stored in the storage unit 16. When the center 10 manages the types of non-volatile memories of the electronic control units 40a to 40d, information on the memory type may be included in the distribution package. When the distribution package of update data for the target ECU of the first type and the distribution package of update data for the target ECU of the second type are generated, the routine proceeds to step S802. Step S802

The center 10 sends the distribution package of update data for the target ECU of the first type and the distribution package of update data for the target ECU of the second type to the OTA master 30. That is, the center 10 separately sends the distribution package of update data for the target ECU of the first type and the distribution package of update data for the target ECU of the second type to the OTA master 30. When these distribution packages are sent to the OTA master 30, the routine proceeds to step S803.

Step S803

The OTA master 30 receives the distribution package of update data for the target ECU of the first type and the distribution package of update data for the target ECU of the second type that are sent separately from the center 10. When the reception of these distribution packages is completed, the routine proceeds to step S804.

Step S804

The OTA master 30 stores the update data (and the information on the memory type etc.) received in the form of the distribution packages from the center 10 in the storage unit 37. The download process thus ends.

With this specific example of the download, the OTA master 30 can separately receive the distribution package of update data for the target ECU of the first type and the distribution package of update data for the target ECU of the second type from the center 10. With this process, when download of either the update data for the target ECU of the first type or the update data for the target ECU of the second type fails, only the distribution package of the update data that failed to be downloaded needs to be redownloaded. The software updates can therefore be completed quickly.

(2) Specific Example of Installation

FIG. 9 is a flowchart illustrating a processing procedure according to a specific example of the installation that is executed by the OTA master 30 and the target ECUs. The specific example of the installation illustrated in FIG. 9 is started after the download of the update data for at least one target ECU is completed and when predetermined conditions are satisfied (it is determined that installation can be executed, the verification result of the update data is good, etc.).

Step S901

The OTA master 30 acquires the type (first type or second type) of the non-volatile memory of each target ECU. When the OTA master 30 manages the type information, the OTA master 30 can acquire the memory type of each target ECU by referring to the type information (FIG. 7) stored in the storage unit 37. When the center 10 manages the type information, the OTA master 30 can acquire the memory type of each target ECU by referring to the information on the memory type included in the received distribution package. When the memory type of each target ECU is acquired, the routine proceeds to step S902.

Step S902

The OTA master 30 and each target ECU start installation of update software in the target ECU of the first type and installation of update software in the target ECU of the second type in parallel. Installation is a process of writing update software in the storage area of the non-volatile memory of the target ECU based on the update data. When the update data includes update software, installation is executed by transferring the update data from the OTA master 30 to the target ECU. The installation in the target ECUs is started all at once or in a predetermined order regardless of the type (first type or second type) of the non-volatile memory of the target ECUs. Installation of the update software in the target ECU of the first type and installation of the update software in the target ECU of the second type need not necessarily executed in parallel. For example, the installation of the update software in the target ECUs may be executed sequentially in the order that the download of the update data is completed, or may be executed using a combination of predetermined pieces of update software. When the parallel installation in the target ECUs is started, the routine proceeds to step S903.

Step S903

The OTA master 30 determines whether the installation of the update software is completed in all the target ECUs (first type and second type). The OTA master 30 may determine that the installation of the update software is completed in all the target ECUs when the OTA master 30 receives a completion notification from each target ECU. Alternatively, the OTA master 30 may determine that the installation of the update software is completed in all the target ECUs when a predetermined amount of time has passed since the start of the installation. For example, the predetermined amount of time can be set to a value equal to or greater than the maximum amount of time required for the installation in each target ECU. When the OTA master 30 determines that the installation of the update software is completed in all the target ECUs (step S903, YES), the installation in the target ECUs is completed, and the installation process ends. When the OTA master 30 determines that the installation of the update software is not completed in all of the target ECUs (step S903, NO), step S903 is repeated.

With this specific example of the installation, the installation of the update software in the target ECUs is executed in parallel regardless of the type (first type or second type) of the non-volatile memory in the target ECUs. With this process, when installation of any update software fails during the preceding installation, the update software that failed to be installed can be reinstalled in parallel with installation of other software update that is currently being installed. Accordingly, the software updates can be completed quickly. There are cases where a plurality of target ECUs is used to implement a predetermined function of the vehicle. In this case, the predetermined function of the vehicle may not be implemented when software on only a part of the target ECUs that is used to implement the predetermined function of the vehicle is updated and software on the remainder of the target ECUs is not updated. That is, consistency may not be ensured between or among these target ECUs. Installing update software in parallel in the target ECUs makes it easier to ensure the consistency between or among the target ECUs.

(3) Specific Example of Activation

FIG. 10 is a flowchart illustrating a processing procedure according to a specific example of the activation that is executed by the OTA master 30 and the target ECUs. The activation process illustrated in FIG. 10 is started after the installation of the update software in the target ECU of the first type and the installation of the update software in the target ECU of the second type are completed and when predetermined conditions are satisfied (it is determined that activation can be executed, the verification result of the update data is good, etc.).

Step S1001

The OTA master 30 and the target ECU of the first type start activation of the update software written in the storage area of the non-volatile memory of the target ECU of the first type. The activation is started all at once or in a predetermined order in all the target ECUs of the first type. When the activation of the update software in the target ECU of the first type is started, the routine proceeds to step S1002.

Step S1002

The OTA master 30 and the target ECU of the second type start activation of the update software written in the storage area of the non-volatile memory of the target ECU of the second type. The activation is started all at once or in a predetermined order in all the target ECUs of the second type. The activation of the update software in the target ECU of the second type may be started after the activation of the update software in all the target ECUs of the first type is completed. The activation of the update software in the target ECU of the second type may be started after the activation of the update software in a predetermined part of the target ECUs of the first type is completed. When the activation of the update software in the target ECU of the second type is started, the routine proceeds to step S1003.

Step S1003

The OTA master 30 determines whether the activation of the update software is completed in all the target ECUs (first type and second type). The OTA master 30 may determine that the activation of the update software is completed in all the target ECUs when the OTA master 30 receives a completion notification from each target ECU. Alternatively, the OTA master 30 may determine that the activation of the update software is completed in all the target ECUs when a predetermined amount of time has passed since the start of the activation. For example, the predetermined amount of time can be set to a value equal to or greater than the maximum amount of time required for the activation in each target ECU. When the OTA master 30 determines that the activation of the update software is completed in all the target ECUs (step S1003, YES), the activation in the target ECUs is completed, and the activation process ends. When the OTA master 30 determines that the activation of the update software is not completed in all the target ECUs (step S1003, NO), step S1003 is repeated.

With this specific example of the activation, the software update on the target ECU of the second type can be executed after confirming the success of the software update on the target ECU of the first type. Therefore, the software update process for the system including both a target ECU with a single bank memory and a target ECU with a dual bank memory can be suitably performed. In the activation process, the activation of the update software in the target ECU of the second type may be started first (step S1002), and the activation of the update software in the target ECU of the first type may then be started (step S1001).

Operations and Effects

As described above, with the network system of the embodiment of the present disclosure, the OTA master receives update data for an electronic control unit with a single bank memory (non-volatile memory of first type) and update data for an electronic control unit with a dual bank memory (non-volatile memory of second type) in the form of separate distribution packages from the center. The OTA master then executes installation of update software in the electronic control unit with a single bank memory and installation of update software in the electronic control unit with a dual bank memory in parallel based on the pieces of update data received in parallel.

With this process, when any distribution package is not successfully sent or received due to a communication error etc., only that distribution package (the distribution package that is not successfully sent or received) needs to be sent or received again. An increase in amount of communication (communication load) between the center and the OTA master can therefore be suppressed. When installation of any update software fails, the update software that failed to be installed can be reinstalled in parallel with installation of other update software. Accordingly, the software updates can completed quickly.

Although one embodiment of the technique of the present disclosure is described above, the present disclosure can be interpreted not only as an OTA master but also as a method that is performed by an OTA master including a processor and a memory, programs, a computer-readable non-transitory storage medium storing programs, a center capable of communicating with an OTA master, a system including a center and an OTA master, a vehicle including an OTA master, etc. The center may include one or more processors. The OTA master may include one or more processors.

The technique of the present disclosure can be used in a network system for updating software on an electronic control unit.

What is claimed is:
1. A system comprising:
an over-the-air (OTA) processor configured to control a software update on a plurality of electronic control units mounted on a vehicle; and
a center processor configured to communicate with the OTA processor wherein:
the center processor is configured to,
acquire type information indicating whether a non-volatile memory of each control unit of the plurality of electronic control units is a non-volatile memory of a first type or a non-volatile memory of a second type,
generate a first distribution package and a second distribution package separately by using the type information, the first distribution package including only update data for one or more first electronic control unit units of the plurality of electronic control units with the non-volatile memory of the first type, the second distribution package including only update data for a second electronic control unit of the plurality of electronic control units with the non-volatile memory of the second type, the non-volatile memory of the first type including only one storage area, the non-volatile memory of the second type including two storage areas, separately send the first distribution package and the second distribution package to the OTA processor; and the OTA processor is configured to
separately receive the first distribution package and the second distribution package sent from the center processor, and
perform control of the software update in parallel on the electronic control units to be updated, based on the update data that is received.

2. The system according to claim 1, wherein at least one of the center processor and the OTA processor is configured to store the type information.

3. The system according to claim 1, wherein the OTA processor is configured to execute activation of the second electronic control unit after starting activation of the one or more first electronic control units.

4. The system according to claim 1, wherein:
the one or more first electronic control units includes a plurality of first electronic control units; and
the center processor is configured to generate the first distribution package including only update data for the plurality of first electronic control units.

* * * * *